United States Patent [19]

Ogata

[11] Patent Number: 5,426,766
[45] Date of Patent: Jun. 20, 1995

[54] MICROPROCESSOR WHICH HOLDS SELECTED DATA FOR CONTINUOUS OPERATION

[75] Inventor: Koji Ogata, Tokyo, Japan

[73] Assignee: NEC Corporation, Tokyo, Japan

[21] Appl. No.: 294,011

[22] Filed: Aug. 23, 1994

Related U.S. Application Data

[63] Continuation of Ser. No. 812,697, Dec. 23, 1991, abandoned.

[30] Foreign Application Priority Data

Jan. 17, 1991 [JP] Japan .................................. 3-003556

[51] Int. Cl.6 .......................................... G06F 12/00
[52] U.S. Cl. .................................... 395/425; 395/800; 364/DIG. 1
[58] Field of Search ................................ 395/800, 425

[56] References Cited

U.S. PATENT DOCUMENTS 4,146,786  8/1979  Gollomp ............................ 364/200
4,342,079  7/1982  Stewart et al. ..................... 364/200
4,601,018  7/1986  Baum et al. ........................ 365/189
4,967,397  10/1990 Walck ................................. 365/222
5,155,853  10/1992 Mitsuhira et al. ................. 395/725
5,206,942  4/1993  Ibi ........................................ 395/425
5,307,502  4/1994  Watanabe et al. ................. 395/800

Primary Examiner—Alyssa H. Bowler
Assistant Examiner—Denise Tran
Attorney, Agent, or Firm—Whitham, Curtis, Whitham & McGinn

[57] ABSTRACT

A microprocessor includes a switching register bank having switching registers corresponding to the respective data registers of data register banks. Whether to update the contents of each output register of an output register bank is determined on the basis of the stored contents of a corresponding one of the switching registers of the switching register bank. Since part of the stored contents of the output register bank can be continuously used without a copy operation, the processing speed can be increased.

3 Claims, 6 Drawing Sheets

| (AW 2) | 4c |
|---|---|
| (BW 2) | |
| (CW 2) | |
| (DW 2) | |
| (IX 2) | |
| (IY 2) | |
| (BP 2) | |
| (SP 2) | |
| (DS0 2) | |
| (DS1 2) | |
| (PS 2) | |
| (SS 2) | |
| (PC SAVE 2) | |
| (PSW SAVE 2) | |
| (VECTOR PC 2) | |
| (RESERVE) | |

FIG. 6A
PRIOR ART

| (AW 4) | 4c |
|---|---|
| (BW 4) | |
| (CW 4) | |
| (DW 4) | |
| (IX 4) | |
| (IY 4) | |
| (BP 4) | |
| (SP 4) | |
| (DS0 4) | |
| (DS1 4) | |
| (PS 4) | |
| (SS 4) | |
| (PC SAVE 4) | |
| (PSW SAVE 4) | |
| (VECTOR PC 4) | |
| (RESERVE) | |

FIG. 6B
PRIOR ART

MICROPROCESSOR WHICH HOLDS SELECTED DATA FOR CONTINUOUS OPERATION

This application is a continuation of application Ser. No. 07/812,697, filed on Dec. 23, 1991, now abandoned.

BACKGROUND OF THE INVENTION

The present invention relates to a microprocessor and, more particularly, to a microprocessor designed to perform predetermined processing in accordance with the stored contents of selected one of a plurality of data register banks.

As shown in FIG. 5, a microprocessor of this type includes a plurality of data register banks 11 to 18 arranged in an internal RAM 1, and a bank selecting circuit 2. Each of the data register banks has a plurality of data registers DR. Predetermined data is stored in each data register DR. When a given data register bank is selected, the stored data of the corresponding data registers DR are read out. The bank selecting circuit 2 includes a bank selecting register 21 having bit registers BR arranged in correspondence with the data register banks 11 to 18 and designed to store 1-bit binary data, and a plurality of AND circuits G21, each having two input terminals for respectively receiving an output from a corresponding one of the bit registers BR and a bank switching signal BS. Each of the data register banks 11 to 18 is constituted by a plurality of data registers DR. With this arrangement, when a bank switching command or an interruption is generated, one of the data register banks 11 to 18 is selected in accordance with an output from one of the AND circuits 21 which is based on the stored contents of the bank selecting register 21, i.e., bit data "1", in response to the bank switching signal BS. Data from the respective data registers DR of the selected data register bank are stored in the corresponding output registers OR, of an output register bank 4c, which are respectively arranged in correspondence with the data registers DR of the data register banks 11 to 18, in accordance with a data switching signal DS. The stored data are then supplied to a CPU.

When a new data register bank is selected by the bank switching signal BS, all the stored contents of the respective output registers OR of the output register bank 4c are replaced with the respective data registers DR of the newly selected data register bank. This state is shown in FIGS. 6A and 6B. The data of the previously used data register bank 12, shown in FIG. 6A, are replaced with the data of the newly selected data register bank 14, shown in FIG. 6B.

Switching of the data register banks 11 to 18 is performed by changing the contents of the bank selecting register 21, i.e., changing the bit position of data "1".

In the above-described conventional microprocessor, when the data register banks 11 to 18 are switched from each other, all the stored contents of the output register bank 4c are updated. For this reason, if part of the previously used data of the output register bank 4c is to be used after a switching operation, the contents of the output register bank 4c before the switch operation must be saved in another register or storage area, and part of the saved data must be set in the output register bank 4c again. That is, a copy operation is required. This decreases the overall processing speed.

In addition, since only one output register bank 4 is used, multitask processing is difficult to perform.

SUMMARY OF THE INVENTION

It is an object of the present invention to provide a microprocessor which allows continuous use of part of data before a switching operation without requiring a copy operation, thereby preventing a decrease in processing speed.

It is another object of the present invention to provide a microprocessor which can easily perform multitask processing.

In order to achieve the above objects, according to the present invention, there is provided a microprocessor comprising a plurality of data register banks, each including a plurality of data registers, each of which stores a plurality of preset data, and each of the data register banks outputting the stored data in a selected state, a bank selecting circuit for setting one of the data register banks in a selected state, a switching control circuit, including a switching register bank having a plurality of switching registers corresponding to the respective data registers of the data register banks, for outputting a plurality of switching control signals on the basis of switching data preset in the respective switching registers, and an output register bank, including a plurality of output registers corresponding to the respective data registers of the data register banks, for storing data from the corresponding data registers of the data register bank set in a selected state by the bank selecting circuit in accordance with the respective switching control signals corresponding to the respective output registers.

BRIEF DESCRIPTION OF THE DRAWINGS

FIGS. 2A and 2B are views for explaining an operation of the embodiment in FIG. 1, showing the data formats of an output register bank and the like;

FIGS. 6A and 6B are views for explaining an operation of the microprocessor in FIG. 5, showing the data format of an output register bank.

DESCRIPTION OF THE PREFERRED EMBODIMENTS

Figure 1:
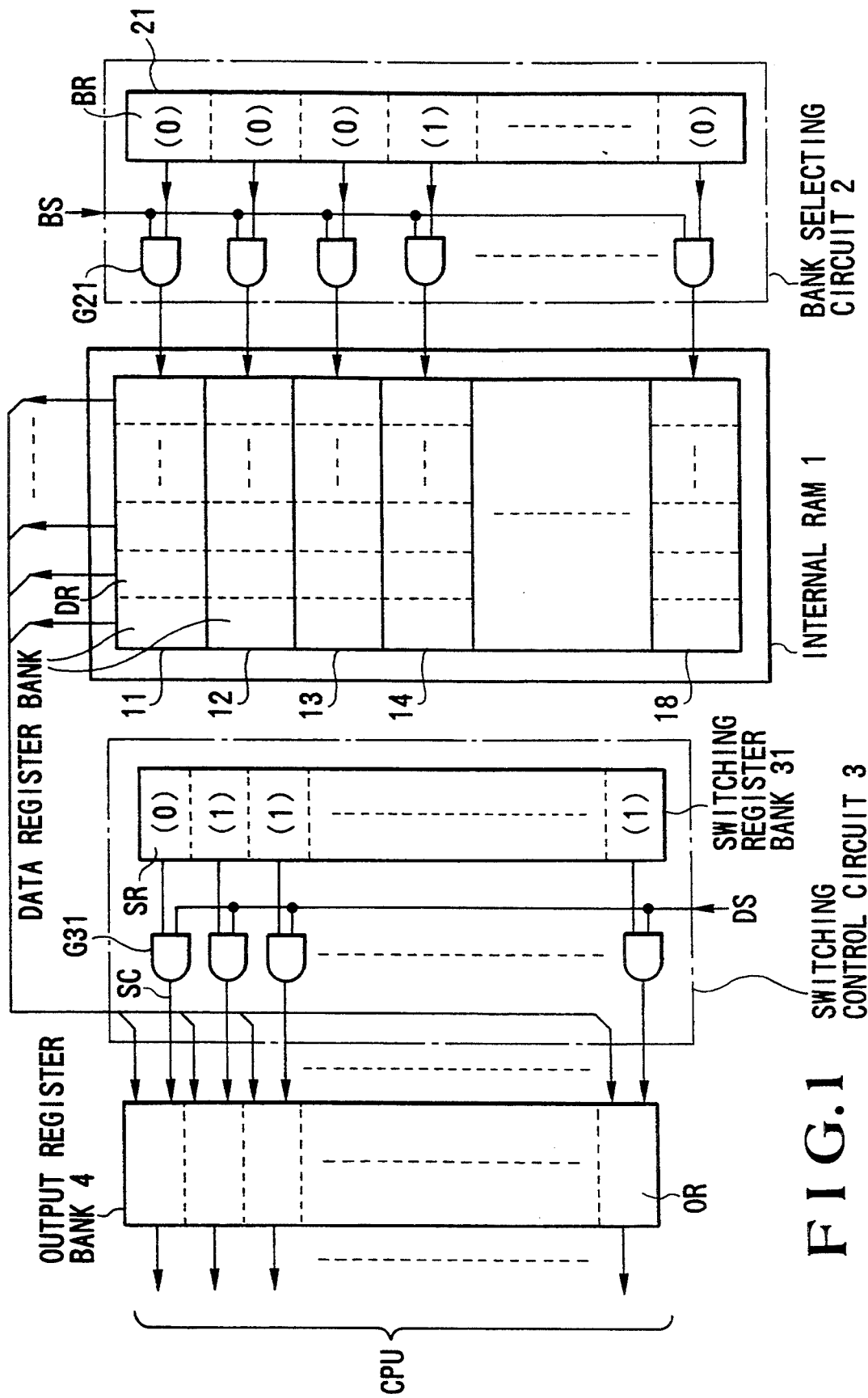
FIG. 1 is a circuit diagram showing an embodiment of the present invention.

Embodiments of the present invention will be described below with reference to the accompanying drawings.

A plurality of data register banks 11 to 18 are arranged in an internal RAM 1. Each register bank includes a plurality of data registers DR. Predetermined data is stored in each data register DR. When a given data register bank is selected, the stored data of the corresponding data registers DR are read out. Each of the data register bank is constituted by a plurality of data registers.

A bank selecting circuit 2 includes a bank selecting register 21 having bit registers BR arranged in correspondence with the data register banks 11 to 18, and a plurality of AND circuits G21, each having two input terminals for respectively receiving an output from a corresponding one of the bit registers BR and a bank switching signal BS. When a bank switching command or an interruption is generated, one of the data register banks 11 to 18 is selected in accordance with the stored contents of the bank selecting register 21, in response to the bank switching signal BS.

A switching control circuit 3 includes a switching register bank 31 and a plurality of AND circuits G31. The switching register bank 31 includes a plurality of switching registers SR corresponding to the respective data registers DR of the data registers 11 to 18. Predetermined data is stored in each switching register SR. Each AND circuit G31 has two input terminals for respectively receiving an output from a corresponding one of the switching registers SR and a switching control signal SC. The switching control circuit 3 outputs 1-bit binary data stored in the respective switching registers SR and a plurality of switching control signals SC having corresponding levels in accordance with the data switching signal DS.

An output register bank 4 includes a plurality of output registers OR corresponding to the respective data registers DR of the data register banks 11 to 18. In accordance with the levels of the switching control signals SC, data from the data registers DR of a selected one of the data register banks 11 to 18 are stored in the corresponding output registers OR and are output to a CPU.

An operation of this embodiment will be described next.

One of the data register banks 11 to 18 is selected by the bank selecting circuit 2 in the same manner as in the conventional microprocessor.

Data indicating which data of the data stored in the output registers OR of the output register bank 4 are left and which data thereof are updated are stored already in the switching register bank 31 of the switching control circuit 3. If the contents of a given one of the switching registers SR of the switching register bank 31 are data "1", the switching control signal SC of an active level is output from a corresponding one of the AND circuits G31 when the data switching signal DS is set at an active level. The contents of the corresponding output register OR are updated by the contents of the corresponding data register DR. In contrast to this, if the contents of a given one of the switching registers SR are data "0", no output is supplied from the corresponding AND circuit G31, and the switching control signal SC is maintained at an inactive level. Therefore, the contents of the corresponding output register OR are not updated and continuously used.

Since data to be continuously used and data to be updated are simultaneously set in synchronism with the data switching signal DS, a copy operation, which is required in the conventional microprocessor, is not required, thus increasing the overall processing speed.

Figures 2A, 2B:
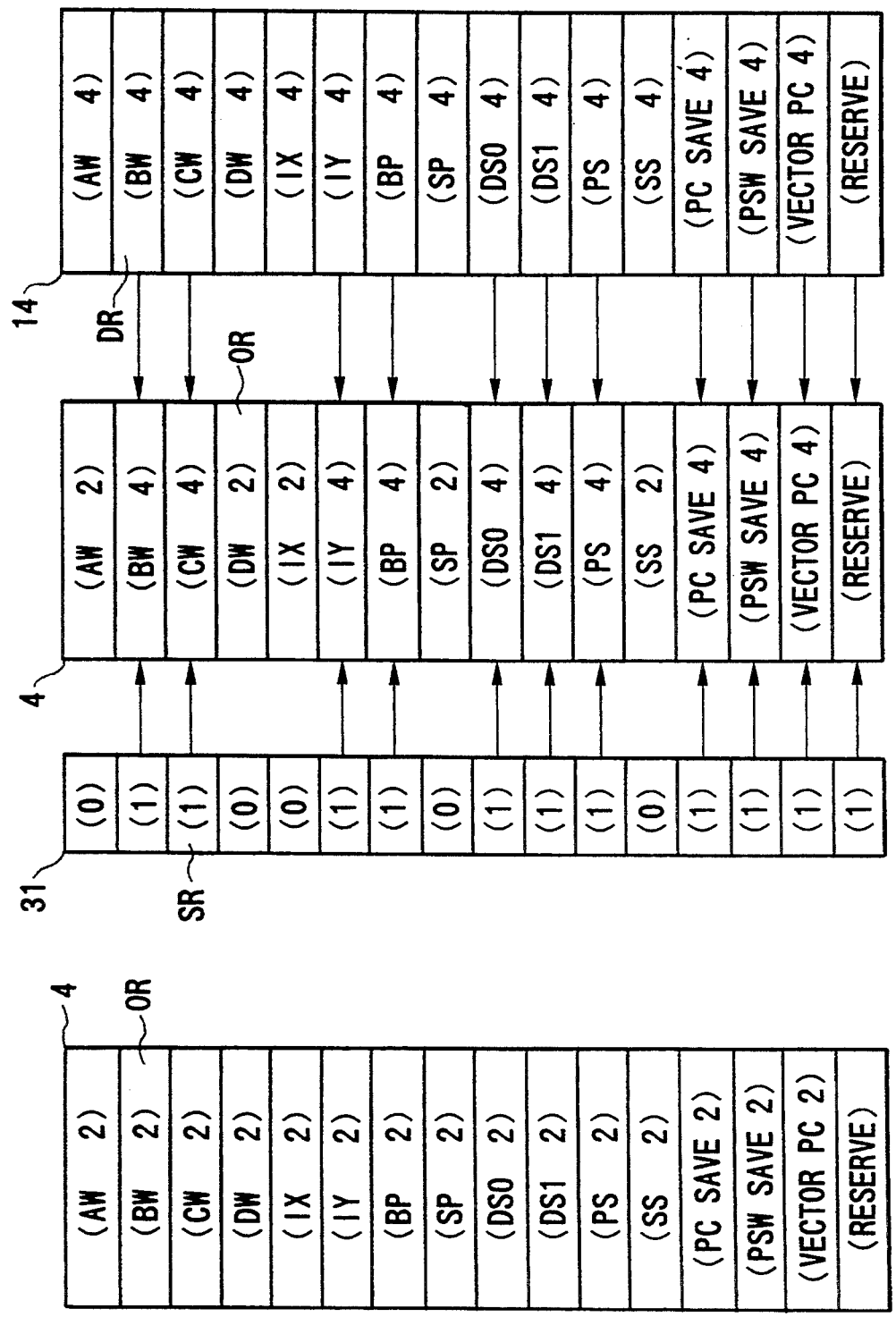

FIGS. 2A and 2B respectively show data formats for explaining a data switching operation of the output register bank 4.

FIG. 2A shows the data format of the output register bank 4 before a switching operation. FIG. 2B shows the data format of the output register bank 4, which is obtained when the contents of the output register bank 4 are updated by the contents of the data register bank 14 in accordance with the contents of the switching register bank 31.

Note that the stored contents of the switching register bank 31 may be changed by means of software or the like every time the data register banks 11 to 18 are switched from each other, or switching register banks 31 may be respectively arranged for the data register banks 11 to 18 to be selectively used.

Figure 3:
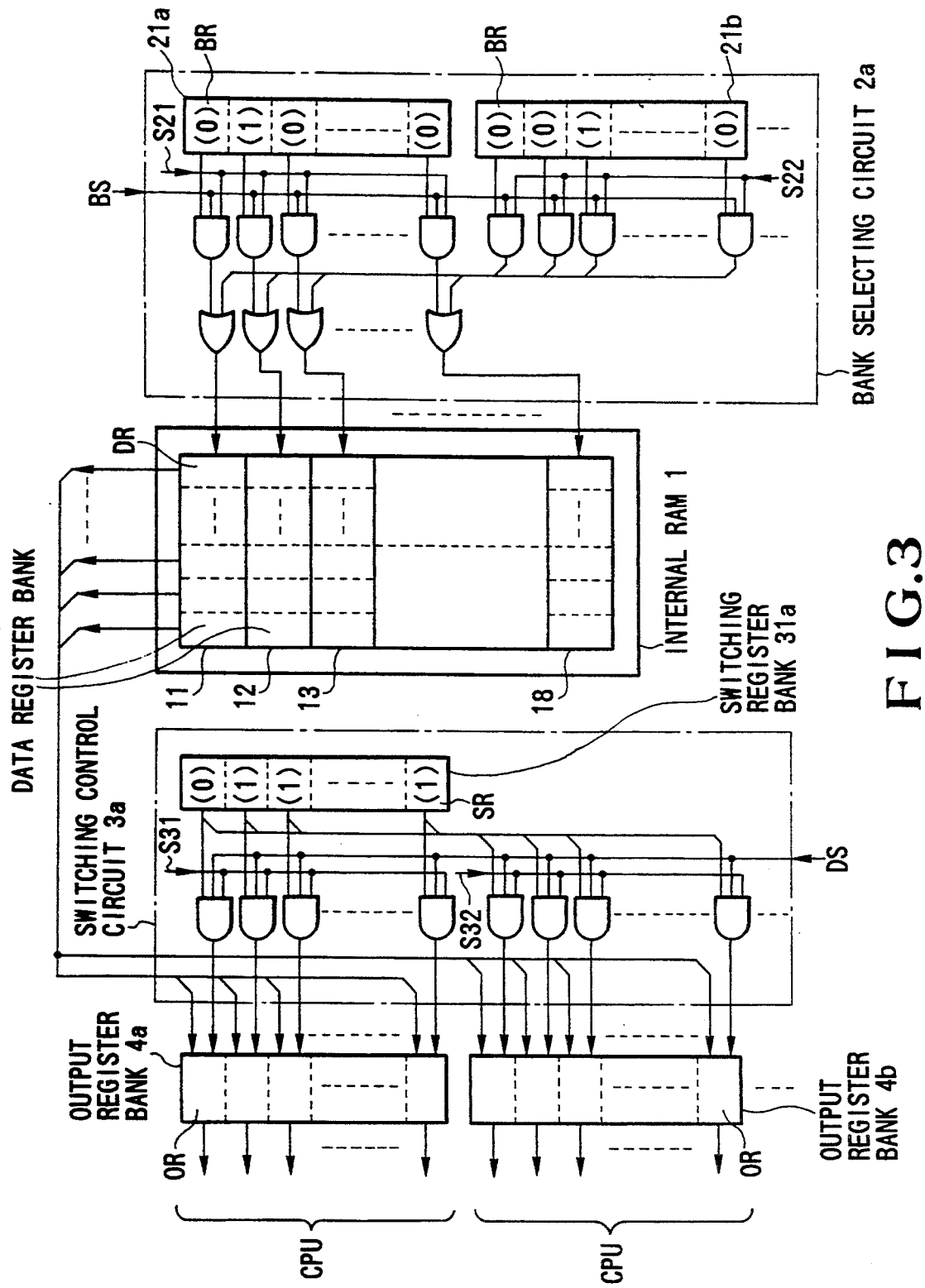
FIG. 3 is a circuit diagram showing another embodiment of the present invention.

FIG. 3 is a circuit diagram showing another embodiment of the present invention.

In this embodiment, in addition to an internal RAM 1, a first bank selecting register 21a, a switching register bank 31a, and a first output register 4a, which are equivalent to those having the same names as in the embodiment shown in FIG. 1, at least one second bank selecting register 21b and one second output register bank 4b are arranged to perform multitask processing.

Update processing of the stored contents (including data to be continuously used) of the output register bank 4a is performed in the same manner as in the embodiment shown in FIG. 1 by setting selection signals S21 and S31 at an active level; selection signals S22 and S32, at an inactive level.

Update processing of the stored contents (including data to be continuously used) of the output register bank 4b can be performed in the same manner as the updating processing of the stored contents of the output register bank 4a by setting the selection signals S21 and S31 at an inactive level; and the selection signals S22 and S32, at an active level. That is, when the contents of the output register banks 4a and 4b are to be updated by the contents of different data register banks, update processing must be performed with a time lag.

In addition, when the contents of the output register banks 4a and 4b are simultaneously updated by the contents of the same data register bank (one of the banks 11 to 18), the selection signals S31 and S32 are simultaneously set at an active level.

If data "1" is set in all the registers of the switching register bank 31a, the contents of the output registers 4a and 4b are completely replaced with the contents of a newly selected data register bank. This equally applied to the embodiment shown in FIG. 1.

Since the plurality of output register banks 4a and 4b are arranged in this manner, multitask processing in the microprocessor can be easily performed.

Figure 4:
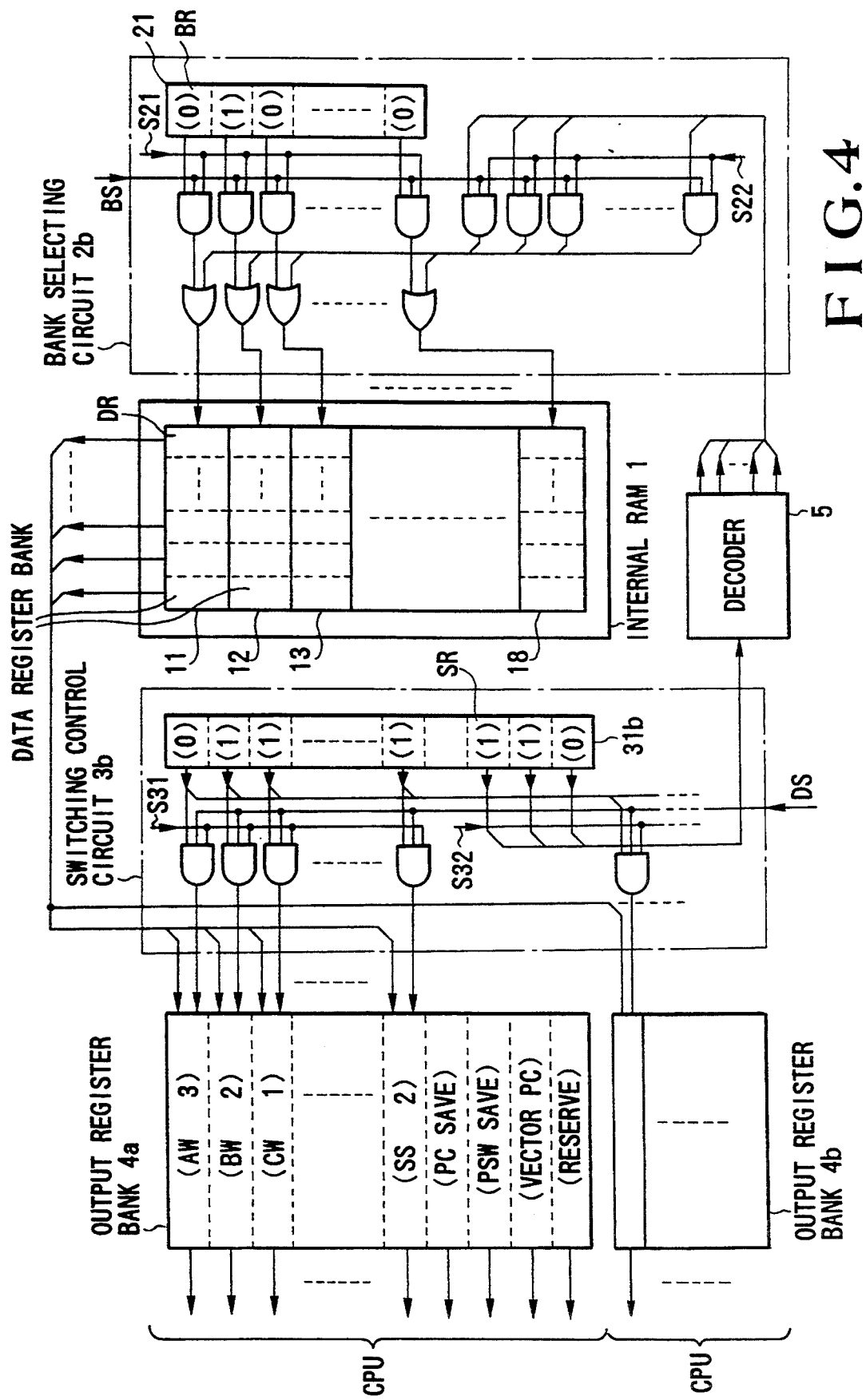
FIG. 4 is a circuit diagram showing still another embodiment of the present invention.
Figure 5:
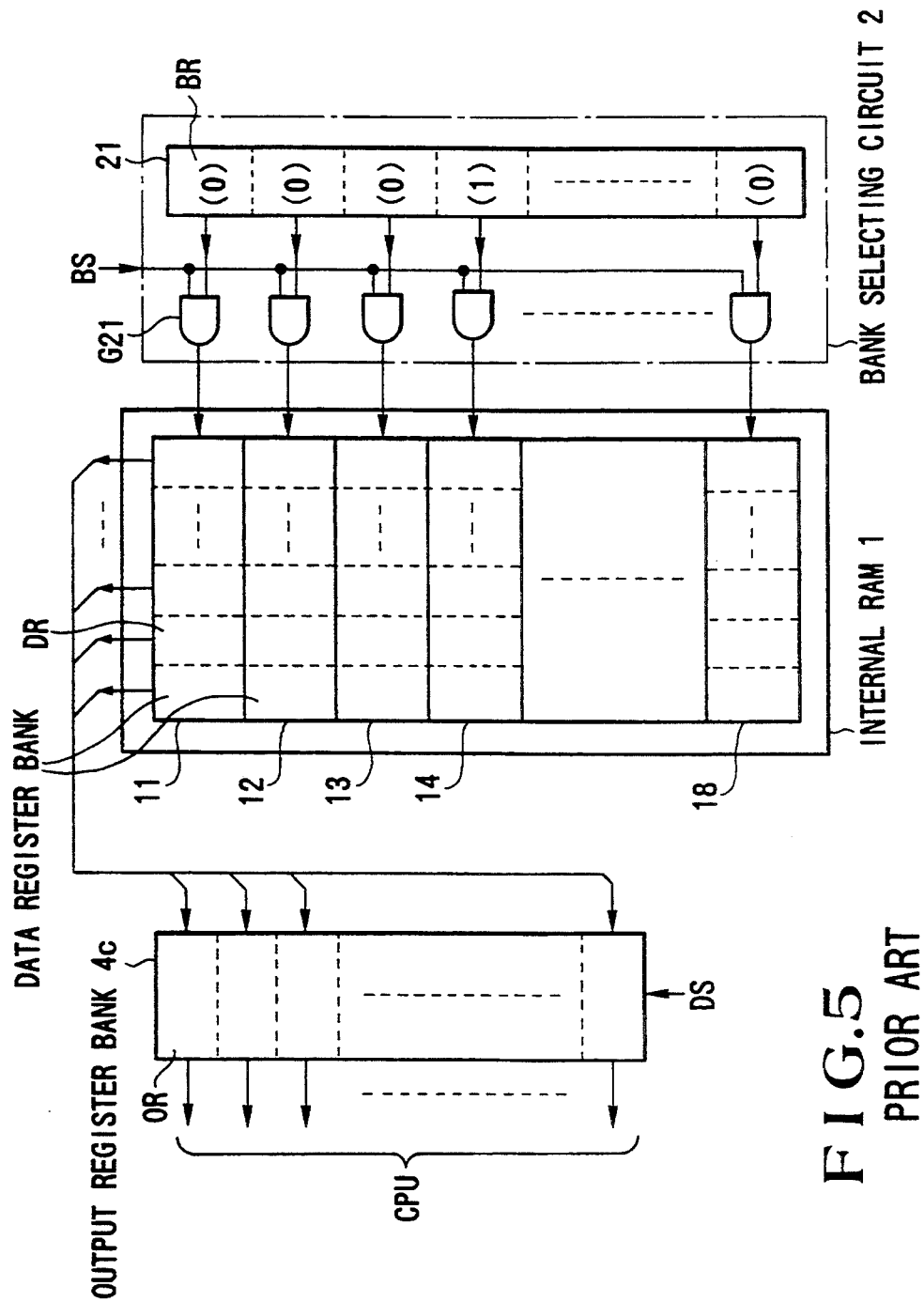
FIG. 5 is a block diagram showing a conventional microprocessor.

FIG. 4 is a circuit diagram showing still another embodiment of the present invention.

In this embodiment, a plurality of free switching registers SR of a switching register bank 31b are used to store data for selecting one of data register banks 11 to 18. Data from these switching registers SR are decoded by a decoder 5 to generate data equivalent to the output data from the bank selecting register 21b of the embodiment shown in FIG. 3. This data is used in place of the output data from the bank selecting register 21b.

In this embodiment, update designation of output register banks 4a and 4b and designation of the data register banks 11 to 18 can be simultaneously performed by one switching register bank 31b.

As has been described above, according to the present invention, a switching register bank having switching registers corresponding to the respective data registers of a data register bank is arranged, and whether to update the contents of each output register of an output register bank is determined in accordance with the contents of a corresponding one of the switching registers of the switching register bank. With this arrangement, since data to be continuously used can be left in the output register bank, a copy operation, which is required in the conventional microprocessor, is not required. This increases the overall processing speed.

In addition, by arranging a plurality of output register banks and associated circuits in the microprocessor, multitask processing can be easily performed.

What is claimed is:

1. A microprocessor which holds selected task data for continuous operation, comprising:

a plurality of data register banks, each of said data register banks including a plurality of data registers in which task data for the microprocessor are stored, and outputting the task data Stored in said data registers which are in a selected state;

a bank selecting circuit, coupled to said plurality of data register banks, for setting one of said data register banks in said selected state;

a switching control circuit, including a switching register bank having a plurality of switching registers in which switching data corresponding to said data registers Of each of said data register banks are stored, for outputting switching control signals on a basis of the switching data stored in said Switching registers, the switching data stored in said switching registers being 1-bit binary data; and an output register bank, including a plurality of output registers corresponding to said data registers of each of said data register banks, connected to said switching control circuit for supplying said task data to said microprocessor, said output registers individually storing the task data from said data registers of a selected one of said data register banks therein in accordance with the switching control signals Corresponding to said output registers, said switching control circuit being connected to said output register bank to select particular output registers which are to hold their data for continuous use by the microprocessor by switching data stored in said Switching register to prevent data in selected particular output registers from being overwritten, wherein said output register bank comprises a plurality of output register banks connected to commonly receive data from said data registers, said bank selecting circuit selecting said data register banks at different timings in accordance with a plurality of selection signals generated by said microprocessor and received by said bank selecting circuit, and said switching control circuit respectively outputting switching control signals to said output register banks at predetermined timings to cause said output register banks to selectively store the contents of respective data register banks, wherein said switching control circuit comprises a plurality of AND logic circuits corresponding with respective ones of said output registers, each of said AND logic circuits receiving an output from a corresponding one of said switching registers and enabled by a data switching signal, said AND logic circuits further receiving one of a plurality of selecting signals, generated by said microprocessor and received by said AND logic circuits, for selecting one of said output register banks and generating said switching control signals to corresponding ones of said output registers in said output register banks.

2. The microprocessor according to claim 1, wherein said bank selecting circuit comprises a plurality of bank selecting registers each having a plurality of bit registers, each bit register in a bank selecting register corresponding to one of said data register banks and storing selection data, and logic circuit means for selecting one of said bank selecting registers, and for setting one of said data register banks in said selected state in accordance with the selection data stored in said selected bank selecting register.

3. The microprocessor according to claim 1, wherein said switching register bank further includes a plurality of free switching registers, said microprocessor further comprising a decoder for decoding outputs from said plurality of free switching registers of said switching register bank, and logic circuit means for selecting one of said bank selecting register or an output of said decoder, and for setting one of said data register banks in said selected state in accordance with either the selection data stored in said bank selecting register or preset data stored in said free switching registers.

* * * * *